United States Patent
DeHaan et al.

(10) Patent No.: US 8,576,338 B2
(45) Date of Patent: Nov. 5, 2013

(54) DEVICE AND METHOD FOR PROCESSING VIDEO DATA

(75) Inventors: Wiebe DeHaan, Eindhoven (NL); Roelof Engelbert Albrecht Reusens, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 13/322,583

(22) PCT Filed: Jun. 3, 2010

(86) PCT No.: PCT/IB2010/052482
§ 371 (c)(1),
(2), (4) Date: Nov. 28, 2011

(87) PCT Pub. No.: WO2010/143106
PCT Pub. Date: Dec. 16, 2010

(65) Prior Publication Data
US 2012/0075526 A1    Mar. 29, 2012

(30) Foreign Application Priority Data
Jun. 8, 2009   (EP) .................................. 09162161

(51) Int. Cl.
*H04N 5/445* (2011.01)
(52) U.S. Cl.
USPC ............ 348/564; 348/468; 348/589; 348/556
(58) Field of Classification Search
USPC ......... 348/556–557, 563–566, 468, 461, 569, 348/570, 704, 584, 589
See application file for complete search history.

(56) References Cited

U.S. PATENT DOCUMENTS

| 5,546,131 A * | 8/1996 | Terry .......................... 348/564 |
| 5,907,659 A | 5/1999 | Yamauchi et al. |
| 6,714,254 B2 | 3/2004 | Enomoto |
| 2002/0089523 A1 | 7/2002 | Hodgkinson |
| 2005/0008347 A1 | 1/2005 | Jung et al. |
| 2005/0017988 A1 | 1/2005 | Ackley et al. |

(Continued)

FOREIGN PATENT DOCUMENTS

| DE | 10126623 A1 | 1/2002 |
| EP | 0700211 A2 | 3/1996 |

(Continued)

OTHER PUBLICATIONS

Blu-ray Disc, White Paper Blu-ray Disc Format, Aug. 2004.
Philips EN User Manual, BDP9100, 2009.
"High Definition Multimedia Interface", Specification, Version 1.3a, Nov. 10, 2006.

* cited by examiner

Primary Examiner — Michael Lee (57) ABSTRACT

A video processing device receives main video data and auxiliary video data for an ultra wide (21:9) display. The main video data has a source aspect ratio, an active video area and black bars. The auxiliary video data is provided separately for display in an overlay area at a first display position. The device receives a display aspect ratio indicator, and has a processor (18) for generating the video signal. The data input means (11) further receive offset data coupled to the auxiliary video data indicative of an offset of the auxiliary video data at the display aspect ratio. The processor (18) is arranged for shifting the overlay area in dependence of the offset data from the first display position to a second display position for reducing the black bar area.

13 Claims, 5 Drawing Sheets

(56) References Cited

U.S. PATENT DOCUMENTS

| | | |
|---|---|---|
| 2005/0180858 A1 | 8/2005 | Halgas, Jr. |
| 2006/0061687 A1 | 3/2006 | Dunton |
| 2006/0110111 A1 | 5/2006 | Van Gestel et al. |
| 2006/0143666 A1 | 6/2006 | Okada et al. |
| 2007/0162817 A1 | 7/2007 | Hamada |
| 2007/0198932 A1 | 8/2007 | Uchimura |
| 2008/0134097 A1 | 6/2008 | Uchimura et al. |

FOREIGN PATENT DOCUMENTS

| | | |
|---|---|---|
| EP | 1133176 A2 | 9/2001 |
| EP | 1225762 A2 | 7/2002 |
| WO | 0046988 A2 | 8/2000 |
| WO | 2005009024 A2 | 1/2005 |

```
composition_object() {
    object_id_ref                            16 uimsbf
    window_id_ref                             8 uimsbf
    object_cropped_flag                       1 bslbf
    forced_on_flag                            1 bslbf
    reserved                                  6 bslbf
    composition_object_horizontal_position   16 uimsbf
    composition_object_vertical_position     16 uimsbf
    if (object_cropped_flag==1b) {
        cropping_rectangle() {
            object_cropping_horizontal_position  16 uimsbf
            object_cropping_vertical_position    16 uimsbf
            object_cropping_width                16 uimsbf
            object_cropping_height               16 uimsbf
        }
    }
}
```

FIG. 3

| Syntax | No. of bits | Mnemonics |
|---|---|---|
| dialog_style_set () { | | |
|   Player_style_flag | 1 | bslbf |
|   reserved | 15 | bslbf |
|   number_of_region_styles | 8 | uimsbf |
|   number_of_user_styles | 8 | uimsbf |
|   for (i=0; i<number_of_region_styles;i++) { | | |
|     region_style() { | | |
|       region_style_id | 8 | bslbf |
|       region_style() { | | |
|         region_horizontal_position | 16 | uimsbf |
|         region_vertical_position | 16 | uimsbf |
|         region_width | 16 | uimsbf |
|         region_height | 8 | uimsbf |
|         region_bg_palette_entry_id_ref | 8 | uimsbf |
|         reserved | 8 | bslbf |
|       } | | |
|       text_box_horizontal_position | 16 | uimsbf |
|       text_box_vertical_position | 16 | uimsbf |
|       text_box_width | 16 | uimsbf |
|       text_box_height | 16 | uimsbf |
|       text_flow | 8 | bslbf |
|       text_horizontal_alignment | 8 | bslbf |
|       text_vertical_alignment | 8 | bslbf |
|       line_space | 8 | uimsbf |
|       font_id_ref | 8 | uimsbf |

FIG. 4

| b31 | b30 | b29 | b28 | b27 | b26 | b25 | b24 |
|---|---|---|---|---|---|---|---|
| reserved ||||||||
| b23 | b22 | b21 | b20 | b19 | b18 | b17 | b16 |
| reserved ||||||||
| b15 | b14 | b13 | b12 | b11 | b10 | b9 | b8 |
| reserved ||||||||
| b7 | b6 | b5 | b4 | b3 | b2 | b1 | b0 |
| D A R |||| Scaling value type of x1 for 720x480 16:9 on 1920x1080 or 1280x720 || 50&25HZ video Capability | HD Seconadry video Capability |

DEVICE AND METHOD FOR PROCESSING VIDEO DATA

FIELD OF THE INVENTION

The invention relates to a device for processing video data, the device comprising data input means for receiving main video data and auxiliary video data, the main video data having a source aspect ratio, the main video data having an active video area having an aspect ratio wider than the source aspect ratio and at least one black bar area adjacent to the active video area, the auxiliary video data being arranged for display in an overlay area on the main video by indicating a first display position at which the auxiliary video data covers at least part of the black bar area.

The invention further relates to a method of processing video data, a method of providing auxiliary control data for video data and a record carrier for transferring video data.

BACKGROUND OF THE INVENTION

Devices for sourcing digital video data are known, for example video players like DVD players or set top boxes. A further example is the Blu-ray Disc (BD) system, for example described in US2006/0143666A1 and ref [2]. The source device is to be coupled to a display device like a TV set or monitor. Image data is transferred from between the devices via a suitable interface system, preferably a high-speed digital interface like High Definition Multimedia Interface (HDMI, see ref [1]). The source device processes video data according to the display capabilities of the display device. Alternatively, the processing may be performed in the display device itself.

WO2006/136989 describes displaying input video data, comprising video data placed in a video plane and overlay data placed in an overlay plane. The video plane is shifted compared to the overlay plane so as the overlay plane does not occult the video plane. The resulting shifted video plane and the overlay plane are mixed for generating output data content. The video data which has active video content has an aspect ratio that differs from the aspect ratio of the output content; the remaining area is usually rendered to be black or gray, and is called black bar area. In particular the device shifts the video plane so that the overlay data substantially is in the black bar area.

SUMMARY OF THE INVENTION

Currently wide display devices are being proposed that have a very wide display aspect ratio, e.g. 21:9, substantially corresponding to the aspect ratio of many movies. However, common video formats for storing and transmitting video, such as BD, may not provide video data at the display aspect ratio of the wide display devices. Movies on BD may be authored such that subtitles and pop-up menus are fully or partly appearing in the black bar areas. However, the wide display device will usually try to reduce the black bars by enlarging the active video area and cropping at least part of the black bar area, which now conflicts with the subtitles.

When authoring movies with a 16:9 screen in mind, it makes sense to use the bottom black bar for the subtitles: the movie content is not affected and the black bar is present anyway. However, on a 21:9 screen, the viewer most likely wants to use the full screen size for watching the movie and probably prefers to superimpose subtitles (and pop-up menus) on the active video area. Hence, common video source formats may provide main video data for a display aspect ratio that is less wide than the available display. Moreover, the main video data may have an active video area having an aspect ratio wider than the source aspect ratio and at least one black bar area adjacent to the active video area to fill the remaining area, which is usually called letterbox video. Auxiliary video data, like graphics or subtitles, may be provided as separate data streams. The source device combines the auxiliary video data with the active video in an overlay area on the main video.

Although it would be possible to add to BD players a possibility for the user to manually shift subtitles up (out of the black bar), this has various drawbacks. (1) It is inconvenient for the user to do this for every movie again, (2) the content owner loses control (he may not like the manually selected position, or crucial movie content might be obscured incidentally), (3) it does not work for pop-up menus, which can be positioned at any location, (4) it doesn't work well for more complex situations, e.g. if 2 subtitle windows are applied (which is an option in BD), or some subtitles are displayed at the top of the screen.

Hence, the auxiliary data is commonly arranged for display in the black bar area by indicating a first display position at which the auxiliary video data covers at least part of the black bar area. The black bar must be displayed for letterbox video, even when the aspect ratio of the display device is wider than the aspect ratio of the main video or substantially corresponds to the aspect ratio of the active video.

It is an object of the invention to provide a processing device of the above type that accommodates convenient display of auxiliary video.

For this purpose, according to a first aspect of the invention, the device for processing video data as described in the opening paragraph further comprises aspect ratio means for receiving a display aspect ratio indicator, the display aspect ratio being wider than the source aspect ratio, processing means for generating a video signal for displaying the main video and the auxiliary video at the display aspect ratio, the data input means being arranged for receiving offset data coupled to the auxiliary video data indicative of an offset of the auxiliary video data at the display aspect ratio from the first display position to a second display position at which the auxiliary video data at least partly covers the active video area for reducing said covered part of the black bar area, and the processing means being arranged for shifting the overlay area in dependence of the offset data from the first display position to the second display position.

For this purpose, according to a further aspect of the invention, the method of processing video data, comprises receiving main video data and auxiliary video data, the main video data having a source aspect ratio, the main video data having an active video area having an aspect ratio wider than the source aspect ratio and at least one black bar area adjacent to the active video area, the auxiliary video data being arranged for display in an overlay area on the main video by indicating a first display position at which the auxiliary video data covers at least part of the black bar area, receiving a display aspect ratio indicator, the display aspect ratio being wider than the source aspect ratio, generating a video signal for displaying the main video and the auxiliary video at the display aspect, receiving offset data coupled to the auxiliary video data indicative of an offset of the auxiliary video data at the display aspect ratio from the first display position to a second display position at which the auxiliary video data at least partly covers the active video area for reducing said covered part of the black bar area, and shifting the overlay area in dependence of the offset data from the first display position to the second display position.

For this purpose, according to a further aspect of the invention, the method of providing auxiliary control data for video data, the video data comprising main video data and auxiliary video data, the main video data having a source aspect ratio, the main video data having an active video area having an aspect ratio wider than the source aspect ratio and at least one black bar area adjacent to the active video area, the auxiliary video data being arranged for display in an overlay area on the main video by indicating a first display position at which the auxiliary video data covers at least part of the black bar area, and the method comprising selecting a display aspect ratio wider than the source aspect ratio, providing, as the auxiliary control data, offset data coupled to the auxiliary video data indicative of an offset of the auxiliary video data at the display aspect ratio from the first display position to a second display position at which the auxiliary video data at least partly covers the active video area for reducing said covered part of the black bar area, and transferring the offset data to a destination for, at the destination, generating a video signal for displaying the main video and the auxiliary video at the display aspect ratio, and shifting the overlay area in dependence of the offset data from the first display position to the second display position.

For this purpose, according to a further aspect of the invention, the record carrier for transferring video data, the record carrier comprising a track having marks representing main video data and auxiliary video data, the main video data having a source aspect ratio, the main video data having an active video area having an aspect ratio wider than the source aspect ratio and at least one black bar area adjacent to the active video area, the auxiliary video data being arranged for display in an overlay area on the main video by indicating a first display position at which the auxiliary video data covers at least part of the black bar area, selecting a display aspect ratio wider than the source aspect ratio, the marks further representing offset data coupled to the auxiliary video data indicative of an offset of the auxiliary video data from the first display position to a second display position at which the auxiliary video data at least partly covers the active video area for reducing said covered part of the black bar area when displaying at a display aspect ratio wider than the source aspect ratio by generating a video signal for displaying the main video and the auxiliary video at the display aspect ratio, and shifting the overlay area in dependence of the offset data from the first display position to the second display position.

The above measures have the following effects. The processing device is now aware of the actual display aspect ratio of the destination display due to receiving the display aspect ratio indicator. In particular the device now detects the event that the display aspect ratio is wider than the aspect ratio of the main video data. In that event the active video area is enlarged in the display device for adapting to the available display aspect ratio, e.g. optimally filling the display area with active video. At the same time the black bar area is correspondingly reduced, i.e. cropped to minimum size or not shown at all. Advantageously a larger visible area of active video is provided for the user. Moreover, the offset data is made available which indicates how, when the auxiliary data is to be rendered at the display aspect ratio as specified, it should be shifted to the new, second display position. The offset data may for example indicate a vertical shift relative to the original position of the auxiliary data, or an alternate absolute vertical and/or horizontal position for the auxiliary data. The device is arranged for shifting the auxiliary video data to the second position at which the auxiliary video data at least partly covers the active video area. Hence the auxiliary data is now, at least partly, shown in the area of the active video, while reducing part of the black bar area covered by the auxiliary data.

Advantageously the cropping of the black bar area can be done automatically in the display device without clipping away the auxiliary video data.

The invention is also based on the following recognition. Traditionally positioning the auxiliary video data is performed at the originator of the video data, e.g. the movie studio, by indicating said first display position. For displaying movie material at TV like displays the letterbox format has become common; and the originator usually allows the auxiliary video such as subtitles to be displayed separately outside the active video area. Such placement in the black bar area does not affect the value of the user experience of the video material. However, when displaying letterbox material on a display having a very wide aspect ratio, new problems arise. The auxiliary video has to be shifted into the active video area to avoid either cropping some of the auxiliary data or still displaying the black bars. The inventors have seen that shifting the auxiliary data cannot be performed automatically without violating at least some of the requirements of the originator for the location of the auxiliary video. Hence the inventors have provided a data structure including the offset data to perform said shift of the auxiliary data in the active video area in a controlled way, i.e. under the control of the originator of the video material. It is noted that the video is still formatted according to a predefined standard for a predefined display aspect ratio. Hence the present invention creates the possibility to author video programs for both 21:9 and 16:9 screens and let the player execute the preferred position of the subtitles depending on the display aspect ratio.

Specifically it is to be noted that the offset data is provided coupled to the auxiliary data, i.e. one or more offset values for a specific set of auxiliary data for a specific video program. The offset data is not just a default shift value applicable for any video program, but offset data specific for the respective auxiliary data and the video data. Obviously the auxiliary data itself is dedicated for the respective main video data. By providing the offset data coupled to the auxiliary data the originator has the opportunity to control the shifted location of the auxiliary data, and therefore can actively control and minimize obscuring and other detrimental effects of the auxiliary video data on the active video.

In an embodiment of the system the device comprises a digital output unit for outputting digital video data and transferring control data according to a predetermined digital video transfer format, and the means for receiving a display aspect ratio indicator are comprised in the digital output unit for receiving the display aspect ratio indicator via the control data. The effect is that a display device coupled to the digital output unit communicates the display aspect ratio via the predetermined digital video transfer format, e.g. HDMI. Advantageously, existing, standardized display devices can be used to automatically provide the display aspect ratio to be applied in the video processing and positioning of the auxiliary data.

In an embodiment of the system the offset data comprise at least one of
a vertical shift value to be applied to offset a graphics object;
a vertical shift value to be applied to a subtitle;
an offset instruction embedded in an application program which is comprised in the auxiliary video data for controlling the display of the auxiliary video data.

It is noted that the predetermined digital video transfer format may have one or more types of auxiliary data, for example various graphical planes. The effect is that for a respective type of auxiliary data the corresponding type of offset data is provided. Advantageously each type of auxiliary data is positioned under the control of the originator of the video material in the event of a wide display aspect ratio.

In an embodiment of the system the offset data is provided in an auxiliary data structure according to a predefined video format, at a reserved field in the data auxiliary structure that has a predetermined value according to the predefined video format, and the processing means are arranged for processing said predetermined value as a zero offset and processing further values of the field as offset values. The effect is that the current video processing system will interpret any existing video material without offset data automatically as having a zero offset. Advantageously the new data structure enhanced with offset data is still compatible to existing video devices, like legacy BD players, which will ignore the values in the reserved field.

Further preferred embodiments of the device according to the invention are given in the appended claims, disclosure of which is incorporated herein by reference.

BRIEF DESCRIPTION OF THE DRAWINGS

These and other aspects of the invention will be apparent from and elucidated further with reference to the embodiments described by way of example in the following description and with reference to the accompanying drawings, in which.

In the Figures, elements which correspond to elements already described have the same reference numerals.

DETAILED DESCRIPTION OF EMBODIMENTS

Figure 1:
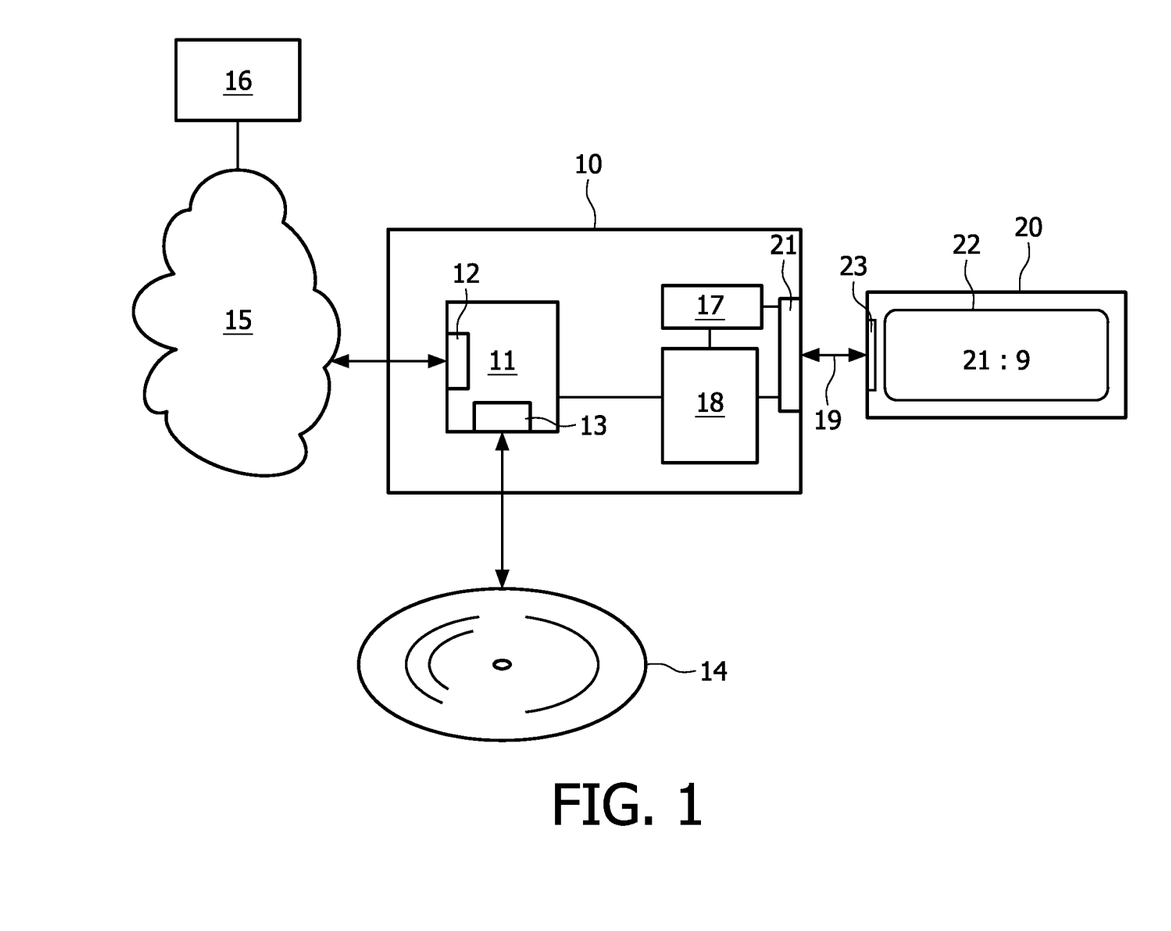
FIG. 1 shows a device for processing video data.

FIG. 1 shows a device for processing video data. The device is shown as a source device 10 for providing a display signal 19 coupled to a destination device 20. The source device 10, e.g. a disc player, is coupled to a display device 20. The source device has a data input unit 11 for receiving video information. For example the data input unit may include an optical disc unit 13 for retrieving video information from an optical record carrier 14 like a DVD or Blu-ray disc (BD).

The data input unit is for receiving main video data and auxiliary video data. The main video data has a source aspect ratio, i.e. it is formatted for a display screen having the source aspect ratio, usually 4:3 or 16:9. In many video programs the main video data has an active video area having an aspect ratio wider than the source aspect ratio and at least one black bar area adjacent to the active video area. The active video area displays the actual video information, while the back bars fill the remaining space to accommodate the source aspect ratio. The auxiliary video data is provided for adding further information to be displayed on top of the main video, such as subtitles, menus, interactive graphics, etc. The auxiliary video data is for display in an overlay area on the main video at a first display position. For the current invention auxiliary data is discussed that covers at least part of the black bar area when displayed at the first display position.

A description of the BD system can be found in the White papers on the Blu-ray Disc Format, see ref [2]. In particular various examples of auxiliary data, such as subtitles and other presentation graphics, and the graphical system for displaying such auxiliary data, are described in White Paper 2B Audio Visual Application Format Specifications. Further information on the BD video data format and playback control can be found in ref [3] and ref [4]. Various graphical planes and interactive graphics are described in ref [5], see FIGS. 10, 12, 15 and 16 and accompanying text therein. Examples of a display position for auxiliary data, in particular so-called composition objects for BD, and a corresponding graphics engine, are described in [6], see FIGS. 19, 24 and accompanying text therein. A different system for providing auxiliary data for display is via an application program to be provided with the main video data, e.g. a Java program. The BD system defines providing such auxiliary data, via so-called BD-J programs, see ref [7]. It is to be noted, that the BD is often used as an example video format in this document, but the system can be equally applied to any video format having separate main video and auxiliary video data, for positioning the auxiliary video data on a display screen having a wider aspect ratio than the main video data.

In an embodiment, the data input unit may include a network interface unit 12 for coupling to a network 15, for example the internet or a broadcast network, such device usually being called a set-top box. Video data may be retrieved from a remote media server 16. The source device may also be a satellite receiver, or a media server directly providing the display signals based on stored data, i.e. any suitable device that outputs a video signal to be coupled to a display unit. The device may have further digital input units for receiving digital video data.

The display device 20 is for displaying video data. The device has an input interface unit 23 for receiving a display signal 19 transferred from the source device 10. The device has a widescreen display unit 22 having a display aspect ratio for displaying the processed image data, for example an LCD unit having a ratio of width to height of 21:9.

The source device 10 has a video processing unit 18 coupled to the data input unit 11 for processing the video information for generating the display signal 19 to be transferred via an output interface unit 21 to the display device. The processing unit 18 is arranged for generating the video data included in the display signal for display on the display device 20. The source device is provided with user control elements, for controlling settings of the device and display parameters of the video data, such as selection of subtitles, or color parameters. The user control elements as such are well known, and may include a remote control unit having various buttons and/or cursor control functions to control the various functions of the source device, such as playback and recording function, e.g. via direct buttons, or via a graphical user interface and/or menus.

The device 10 has an aspect ratio unit 17 for receiving a display aspect ratio indicator. The unit may be coupled to the digital output unit 21 for receiving aspect ratio information, e.g. as defined in HDMI described below. Alternatively the aspect ratio unit 17 may be coupled to a user interface which allows the user to set the display aspect ratio manually. The value of the display aspect ratio may also be derived from other control information, e.g. a device type or a system standard that is made available by the display device via a network interface.

The aspect ratio unit 17 is coupled to the video processing unit 18 to communicate the applicable display aspect ratio. For the explanation below it is assumed that video processing unit 18 detects that the display aspect ratio is wider than the source aspect ratio.

The data input unit 11 is further arranged for receiving offset data. The offset data embodies an indication that the auxiliary data is to be shifted from its first display position to a different display position for a specific display aspect ratio. The offset data is coupled to the auxiliary video data, i.e. one or more offset values are provided for the auxiliary data of the video program that is to be rendered. For example a single offset value can be provided for a video program having limited or less critical auxiliary data. Multiple values may be provided to specify different shifting of more complex auxiliary data. The offset data is specific for the respective auxiliary data and the video data when rendered at the specific display aspect ratio which is wider than the source aspect ratio, and is indicative of an offset of the auxiliary video data from the first display position to a second display position at which the auxiliary video data at least partly covers the active video area. Alternatively the offset values may be absolute vertical and/or horizontal positions that indicates the position to be applied for the wider display. By shifting and displaying the auxiliary data to the second display position said covered part of the black bar area is reduced, preferably to zero. The processing unit 18 is arranged for shifting the overlay area in dependence of the offset data from the first display position to the second display position.

In an embodiment the source device 10 is combined with the display device 20 to a single apparatus. The display signal is the directly coupled from the video processing unit 18 to the display 22. The processing unit 18, or a separate display processor, is arranged for generating the video signal for displaying the main video and the auxiliary video at the display aspect ratio by enlarging the active video area and cropping at least part of the black bar area. The active video is preferably enlarged until the full width of the display unit 22, while at the same time reducing the height of the main video to fit on the display by clipping part or all of the black bar area.

The source device 10 may have a digital output unit 21 for outputting digital video data and transferring control data according to a predetermined digital video transfer format. The aspect ratio unit 17 may be implemented in the digital output unit 21 for receiving the display aspect ratio indicator via the control data.

The digital output unit 21 for outputting digital video data may also transfer control data according to a predetermined digital video transfer format, e.g. HDMI (see ref [1]). For the further description HDMI is used as an example of the predetermined digital video transfer format. It is to be noted that other audio/video interface formats which define similar video and control data transfer can be used also. The processor 18 then provides and processes control messages according to the predetermined digital video transfer format. It is to be noted that the control messages may be separate messages, such as CEC messages defined in HDMI, see ref [1] section 8.6 and Supplement 1 on Consumer Electronics Control (CEC). The messages may also be included in the audio/video data stream, e.g. in a control field of a video frame. An example in HDMI is the Auxiliary Video information (AVI) InfoFrame, see [1] section 8.2, which includes messages on frame signaling on color and chroma sampling, over- and underscan and aspect ratio, etc. The AVI is carried in the AV-stream from the source device to a digital television (DTV) Monitor as an Info Frame. By exchanging control data it may first be established if both devices support the transmission of said metadata. The AVI InfoFrame may be enhanced with ultra wide aspect ratio based on the aspect ratio of the display unit. It is to be noted that the aspect ratio may also be transferred via E-EDID (see [1], section 8.3) or any other suitable transfer protocol in a similar way.

The processing unit 18 may be arranged to process one or more types of offset data. The offset data may include a vertical shift value to be applied to offset a graphics object, a vertical shift value to be applied to a subtitle, an offset instruction embedded in an application program which is comprised in the auxiliary video data for controlling the display of the auxiliary video data. The offset data may further include at least one horizontal shift value. Detailed examples of various types of auxiliary data and offset data are provided below.

It is noted that until recently nobody envisaged that there would be displays in the market with an aspect ratio wider than 16:9. For example, for movies on BD the aspect ratio of the main video is always 16:9. As the original movies usually have a wider aspect ratio, for many BD productions black bars are used (letterbox). Now a new generation of TV sets with an ultra wide aspect ratio, 21:9, has been introduced. In practice the ultra wide TV may detect the black bars and zoom in on the active video part for a more immersive viewing experience. Such TV set has the capability to detect possible subtitles in the black bar and adjust the visible part, so that the subtitles are still shown in a part of the black bar. Also, it may detect station logos from broadcast in the black bars and ignore them. However, in the existing apparatus the black bars remain visible. Moreover, said detection and adjustment of the black bars requires a lot of computing power in the TV.

Figure 2:
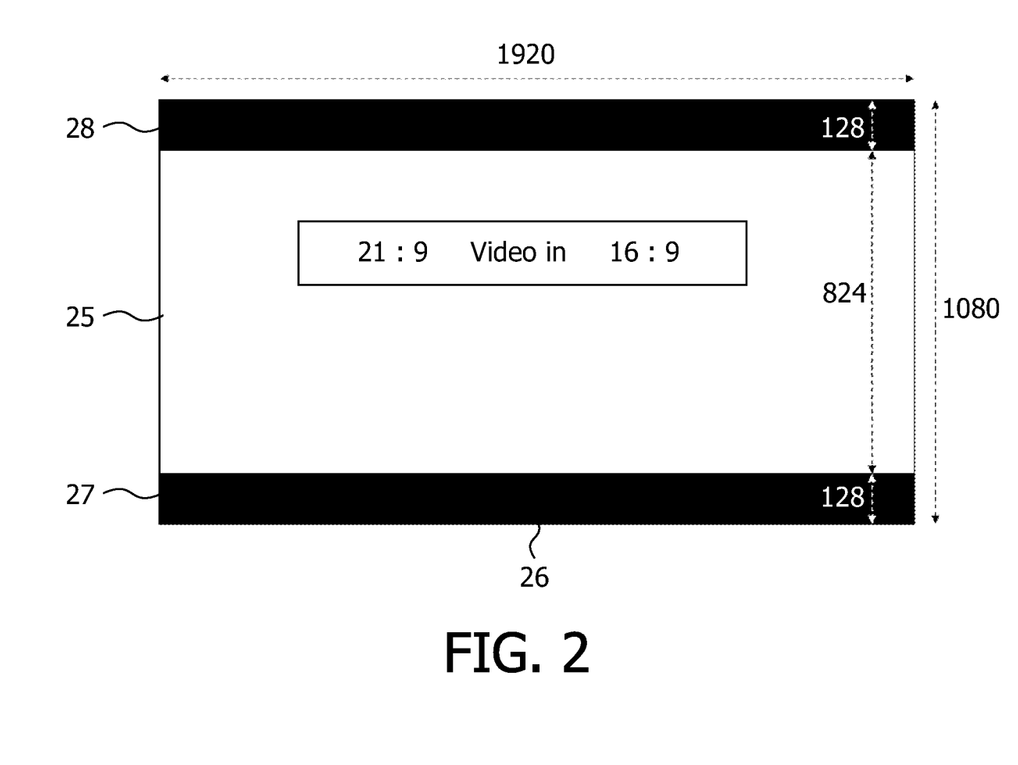
FIG. 2 shows a 21:9 movie embedded in a 16:9 main video format.

FIG. 2 shows a 21:9 movie embedded in a 16:9 main video format. The movie has an aspect ratio of 21:9 and is called active video 25, which is coded in a main video data 26 having a source aspect ratio of 16:9, shown in the Figure as a size of 1920×1080 pixels. The active video area 25 is 1920×824 pixels and would almost exactly fit on a 21:9 TV after linear scaling with a factor of 21/16. Note that the black bars 27,28 in the main video in this example are 128 pixels high.

Offset data for indicating a shift vertical can be stored on the disc for collections of graphical objects. These offsets may be applied in the case the BD Player "knows" that the connected display is an ultra wide display. The offsets are vertical shift values that need to be applied relative to the vertical position information that is used in the normal (16:9) case.

The exact way of storing the offset values differs depending on the type of auxiliary data and the video format. In BD, 4 different types of graphics are defined and can be applied in various combinations in 2 distinct modes. The 2 modes are High Definition Movie mode (HDMV) and Java mode (BD-J). In BD-J the auxiliary graphics are generated under the control of an application program in the Java programming language, also called applet. In both modes there are 2 graphics planes on top of the video plane(s). The first plane in HDMV is the Presentation Graphics plane (PG) and the plane on top of that is the Interactive Graphics plane (IG). In BD-J, the Interactive Graphics plane is replaced by the BD-J Graphics plane, while the PG plane is still available. The PG plane can be used for bitmap based Presentation Graphics, as well as for coded text subtitling (TextST). The PG plane is usually applied for subtitles. Summarizing, the 4 types of graphics are PG, TextST, IG and BD-J. For each graphics object, the player or BD-J program can check if a vertical shift value is available or can be derived, which is then applied to offset the graphics object such that it is most suitable for the overall viewing experience (as determined by the disc author) on an ultra wide display. In practice, the offset data may include shift values as absolute pixel shift values in full of reduced resolution, or as relative values to the full screen size, or any other format that allows calculating the required shift from the original display position to the adapted display position.

In the case of BD-J Graphics, the BD-J program which is loaded from the disc and runs on the BD Player controls the positioning of the BD-J graphics elements. Therefore, for the BD-J Graphics plane, the offset data are included in the program.

In an embodiment, the offset data is provided in an auxiliary data structure according to a predefined video format, at a reserved field in the data auxiliary structure.

Figure 3:
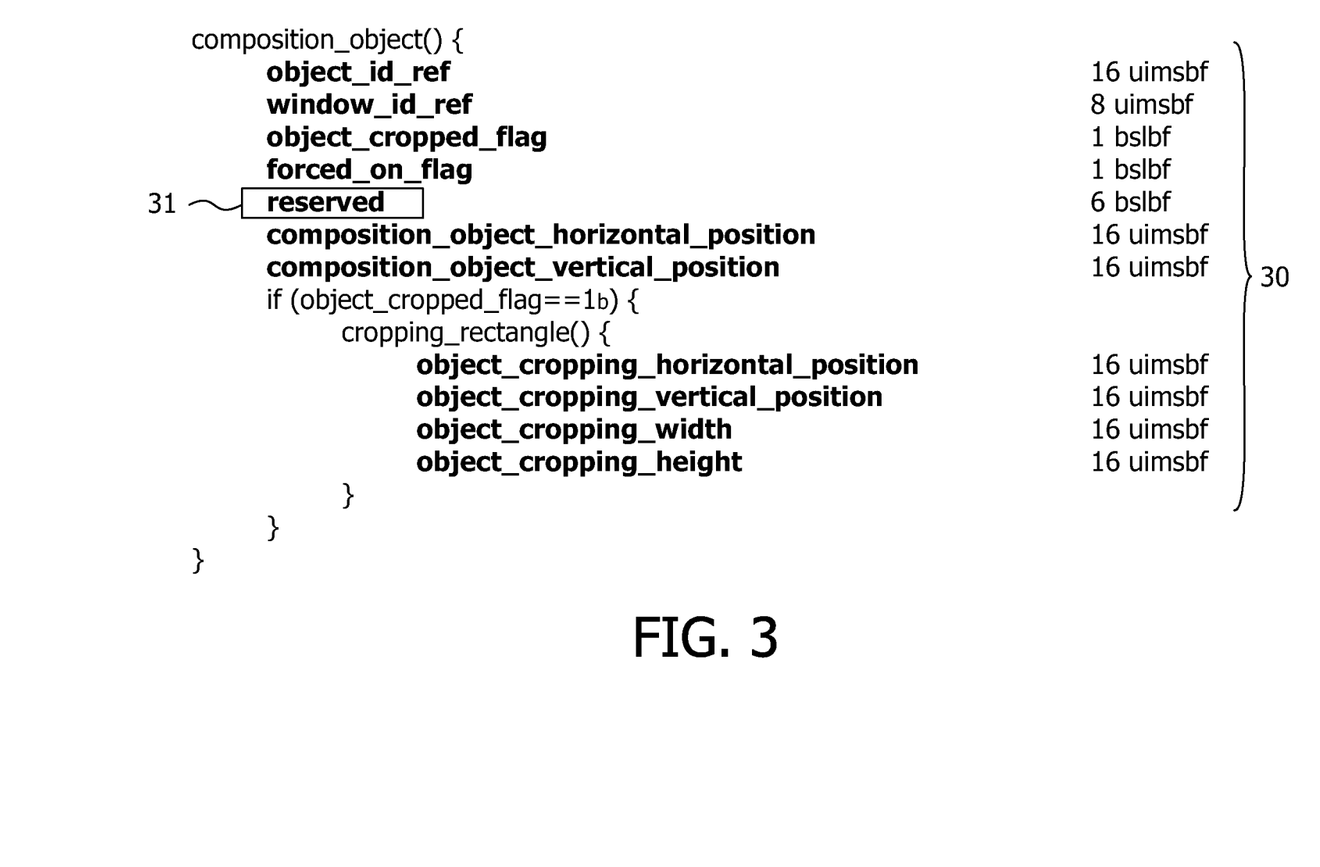
FIG. 3 shows an auxiliary data structure for graphics.

FIG. 3 shows an auxiliary data structure for graphics. The auxiliary data structure 30 has various parameters that define a graphical object, called a composition object, according to the BD format. The data auxiliary structure 30 has a reserved field 31 that has a predetermined value according to the predefined video format, usually zero. The offset data for the object are stored in the reserved field. In the video device, the processor 18 is arranged for processing said predetermined value as a zero offset and processing further values of the field as offset values.

It is noted that, in BD, the graphical objects are to be displayed in an overlay area called window, which is indicated by the parameter window_id_ref. BD currently allows only two of such windows, while predefined restrictions apply with respect to overlap and positions of such windows. Hence the offset data may include different values for the objects in different windows, and may also include specific horizontal or vertical shift values to comply with said overlap restrictions.

In a practical embodiment of the offset data, the shift parameters typically contain a size (number of pixels) and a direction (up or down). A maximum size of 128 is sufficient, considering the size of the black bar in the 21:9 case as shown in FIG. 2. The shift resolution might be reduced to save on the number of bits. E.g. 5 bits might be used to contain a number that needs to be multiplied by a factor to yield the actual shift (e.g. by 4 yielding 0, 4, 8, . . . 124). By using reserved fields in the BD format (which are zero for "legacy" discs) and define 0 as no shift, backwards compatibility is achieved to legacy BD players that do not have the processing for adapting to a wide display aspect ratio.

In a particular video format, the way to store the vertical offset values might be different for the different graphics types, because their data structures are quite different. For each of the graphics types in BD, one example is given below. Note that these are just examples and alternative locations may be applied to store the offset data.

For Presentation Graphics (PG) in BD, vertical shifts need to be applied to the location of windows, which define the rectangular screen areas in which PG is rendered, as well as to the composition objects, which describe which pixels to write to which location in the window on the graphics plane. Therefore the shift needs to be applied to the window_vertical_position as well as to the composition_object_vertical_position. A preferred storage location is the reserved bits field 31 in the composition_object( ) 31, which defines the actual rendering on the graphics plane. One bit should be used for the direction ("0" for down, "1" for up) and 5 for the offset value divided by 4. In case of rendering for an ultra wide display, the offset should be applied for the object to be rendered, as well as for the window where the composition object is referring to (window_id_ref). Multiple Composition Objects are included in Presentation Composition Segments. All Composition Objects that refer to the same window (by window_id_ref) in a Presentation Composition segment shall contain the same value for the offset. Hence in such embodiment the auxiliary video data comprise a multitude of graphical objects defined with reference to a same overlay area, and the offset data comprise a same value for the offset of each of the graphical objects of said multitude.

For Interactive Graphics (IG), the same elements are used as for PG, but there is additional support for effects and selection and activation of buttons. Offset data can be similarly added. For the vertical shift parameters the same reserved fields of composition_object( ) can be used as for PG.

In an embodiment the data input unit 11 is arranged for retrieving the offset data separately from the auxiliary data. Hence the offset data are not stored in the same data structure that also stores the auxiliary data, but are transferred separately. For example, the offset data are in a separate file stored on a record carrier, while the video data and auxiliary data are stored separately. Furthermore, an offset data server may be coupled to a communication network like the internet, and the data input unit then connects to the server. For example, the server may be provided by the author of the main video, or by the manufacturer of the video processing device or the display device. The address of the server may be provided on the record carrier with the audio/video data, or may be entered manually, or preset by said manufacturer, etc. Hence, a list with offset values can be stored on the disc, completely separate from the audio/video streams. In that case linking between offsets and graphics objects could be done by including references that refer to the respective video element (e.g. in BD PlayItem, stream id) and auxiliary data to be shifted (e.g. in BD composition_number, window_id). It is noted that the BD system allows retrieving data and files from different locations and presenting those data in a comprehensive virtual file system. Hence main video, auxiliary video and offset data may all be physically stored on different systems and/or transferred via a different routes.

Figure 4:
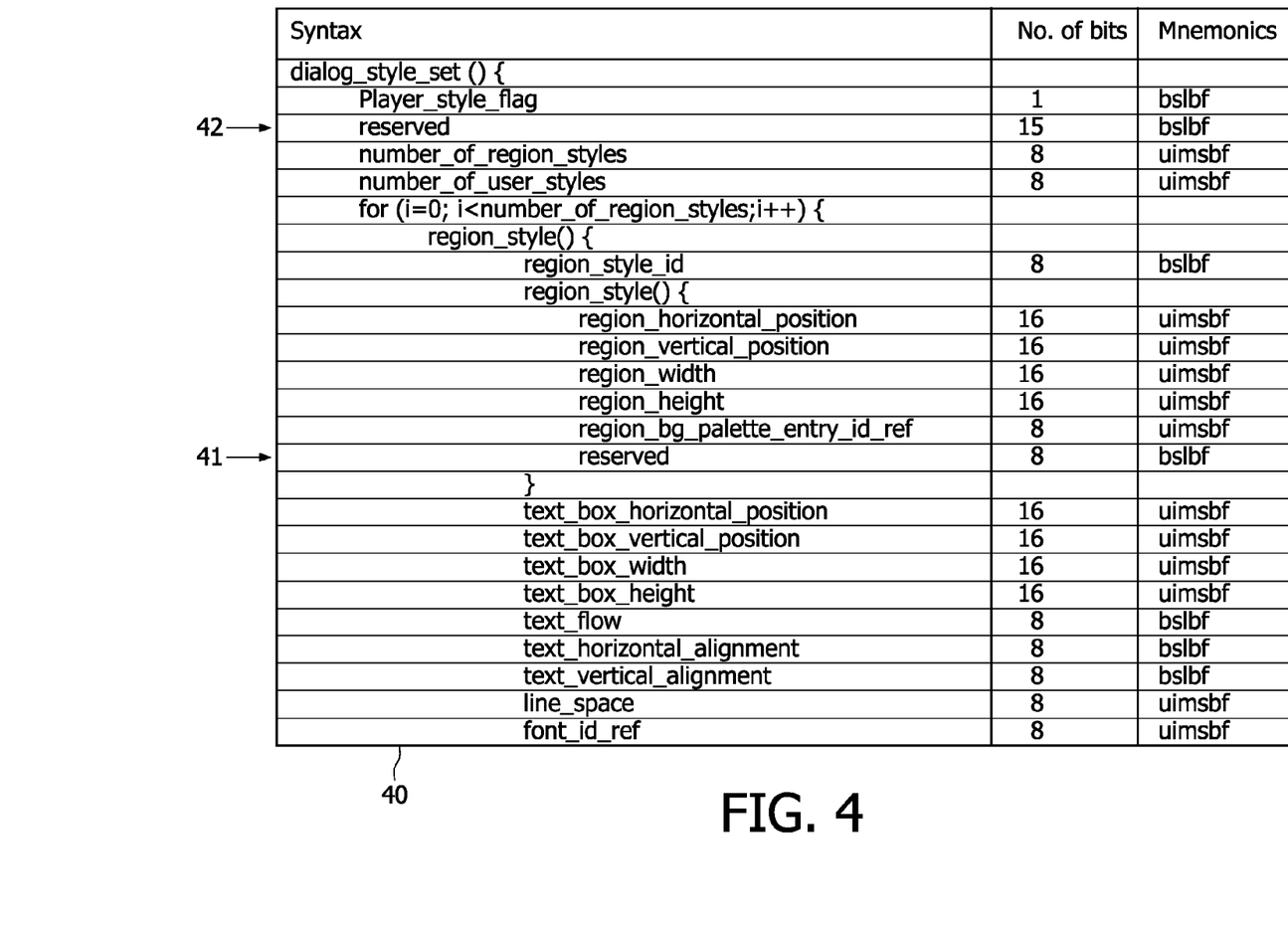
FIG. 4 shows an auxiliary data structure for subtitles.

FIG. 4 shows an auxiliary data structure for subtitles. The auxiliary data structure 40 shows part of the syntax for Text Subtitling in BD (TextST), called dialog_style_set( ) It is noted that the syntax defines a number of possible region styles of displaying text. For each region style, the structure has a reserved field 41. The offset values, i.e. vertical shifts are applied to the region_vertical_position, which defines the original display position. The offset is included as a shift value in the 8 reserved bits in region_info( ).

Alternatively, user styles could be used to contain shifted versions of TextST (also see ref[2], section 4.2.2). User styles contain a list of delta values compared to font styles defined in the above described region styles. A difference value delta is defined for the vertical offset (region_vertical_position_delta). Furthermore, offset data needs to be added to indicate which user styles are to be applied when a 21:9 display is connected. An offset indicator can be added to indicate the respective user styles. In the device the processor 18 will now automatically select the appropriate user styles when the 21:9 display is connected. The maximum number of user styles per region style is 25, while there can be up to 60 region styles. The auxiliary data structure 40 has a further reserved field 42. In an embodiment five of the 15 reserved bits in the reserved field 42 of the dialog_style_set( ) are used to contain a value x indicating that the x user styles with the highest numbers are applicable for 21:9 display. A value of 0 for x now means that 21:9 support is not included. According to the example, the auxiliary video data comprise a multitude of presentation modes of the auxiliary data, and the offset data comprise an offset indicator that designates a subset of said multitude which applies for the display aspect ratio.

Figure 5:
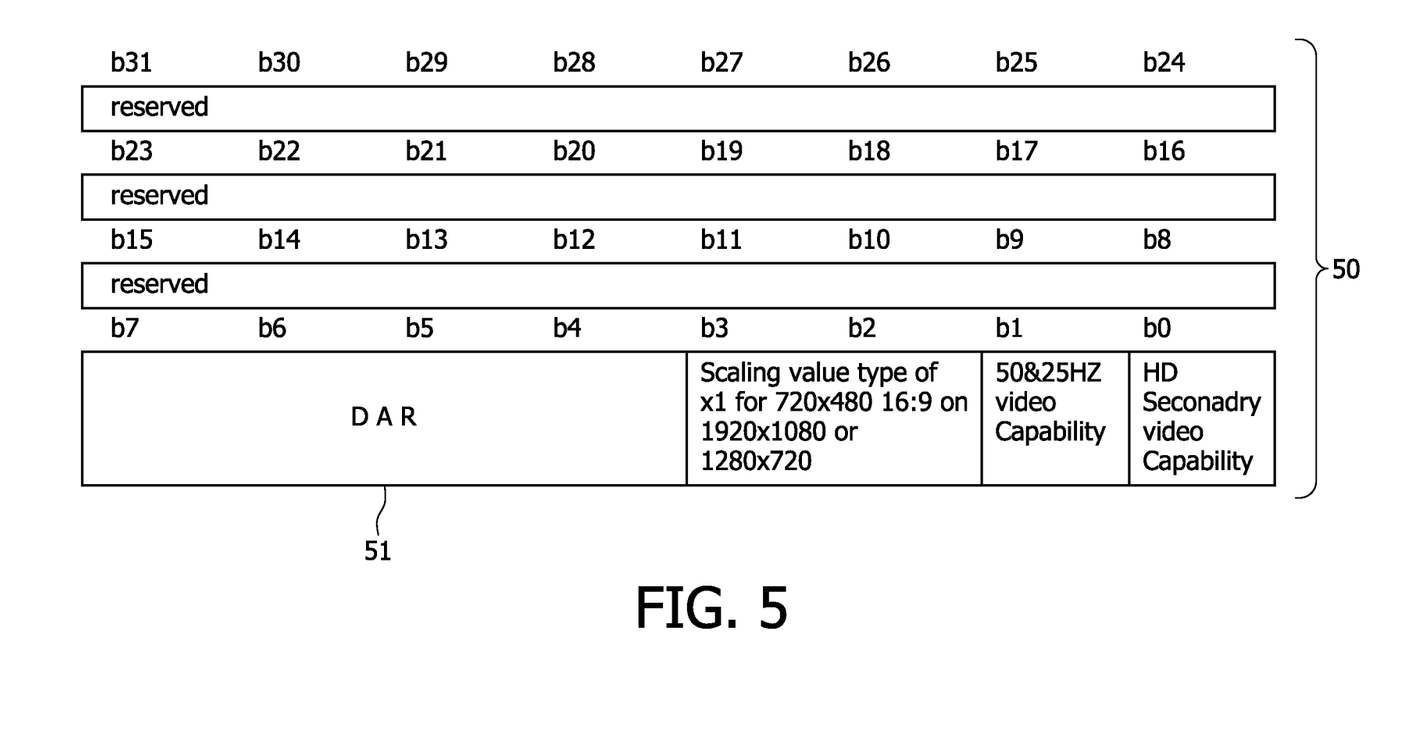
FIG. 5 shows a register indicating video capabilities of a video device.

FIG. 5 shows a register indicating video capabilities of a video device. The register 50 can be implemented as a memory location in the video processing unit 18, or as a separate memory location in the aspect ratio unit 17. The aspect ratio unit 17 is coupled to the video processing unit 18 to communicate the applicable display aspect ratio. The register as shown has a field 51 that stores an indicator DAR of the display aspect ratio. The set-up for this field can be done manually by the user (through the player set-up menus e.g. at first install) or automatically when the player receives such information through the interconnection (e.g. HDMI). The player sets the indicator if an ultra wide display is connected and vertical shifts should be applied to graphics objects in order to move them out of the black bars. In BD, the display aspect ratio may be stored in one of the Player Setting Registers that are defined, e.g. PSR29: Player Capability for Video as shown in FIG. 5.

For BJ-J Graphics in BD, the BD-J programs supplied as auxiliary data are responsible for generating graphics in a desired location, and are adapted to apply the required offset for the display aspect ratio. The display aspect ratio can be retrieved, e.g. from the Player Settings Register 29 (Video Capability), where one of the bits from this register may be used to indicate (by having the value "1") that the display aspect ratio of the connected display is 21:9 instead of 16:9. The BD-J program reads the display aspect ratio from PSR29 and adjusts the position of graphics to optimize the viewing experience for ultra wide displays.

Optionally, players could be equipped with a user setting or button to switch on or off the feature to shift graphics objects. When switched off, the video output content to the 21:9 display will be identical to the video content for a 16:9 display.

The main video, auxiliary video and offset data may be stored on a record carrier 14 as shown in FIG. 1. The record carrier may be of an optically readable type having a track having marks representing the main video data and auxiliary video data, e.g. an extended version of the current DVD or BD. The main video, auxiliary video and offset data are structured as described above. The optical disc can be manufactured by methods including mastering, pressing and molding techniques known as such.

It is to be noted that methods for implementing the invention have the processing steps corresponding to the processing of video data, and providing and processing the offset data in the device as shown and elucidated above. Although the invention has been mainly explained by embodiments using BD storage format and HDMI digital interfaces, the invention is also suitable for any video transfer system (e.g. via broadcast or internet), storage format or interface that provides main video and separate auxiliary video data. The invention may be applied in every video processing device, like a playback or recording apparatus, a switchbox, a multimedia server, an audio video receiver or amplifier, a personal computer having an audio/video interface, etc.

It is noted, that in this document the word 'comprising' does not exclude the presence of other elements or steps than those listed and the word 'a' or 'an' preceding an element does not exclude the presence of a plurality of such elements, that any reference signs do not limit the scope of the claims, that the invention may be implemented by means of hardware, software and/or programmable components, and that several 'means' or 'units' may be represented by the same item of hardware or software, and a processor may fulfill the function of one or more units, possibly in cooperation with hardware elements. Further, the invention is not limited to the embodiments, and lies in each and every novel feature or combination of features described above.

Reference [1]: "High Definition Multimedia Interface; Specification Version 1.3a of Nov. 10 2006" available at http://hdmi.org/manufacturer/specification.aspx Reference [2]: "White papers Blu-ray Disc Format" available at http://www.blu-raydisc.com/; in particular part 2.B Audio Visual Application Format Specifications for BD-ROM; http://www.blu-raydisc.com/Assets/Downloadablefile/2b bdrom_audiovisualapplication_0305-12955-15269.pdf Reference [3]: US2006/0110111A1
Reference [4]: US2007/0162817A1
Reference [5]: US2008/0134097A1
Reference [6]: US2007/0198932A1
Reference [7]: US2006/0143666A1

The invention claimed is:

1. Device for processing video data, the device comprising
data input means for receiving main video data and auxiliary video data, the main video data having a source aspect ratio, the main video data having an active video area having an aspect ratio wider than the source aspect ratio and at least one black bar area adjacent to the active video area, the auxiliary video data being arranged for display in an overlay area on the main video by indicating a first display position at which the auxiliary video data covers at least part of the black bar area,
aspect ratio means for receiving a pre-stored display aspect ratio indicator upon being coupled to a digital display unit, wherein the display aspect ratio of the digital display unit is wider than the source aspect ratio,
processing means for generating a video signal for displaying the main video and the auxiliary video at the display aspect ratio,
the data input means being arranged for receiving offset data coupled to the auxiliary video data indicative of an offset of the auxiliary video data at the display aspect ratio from the first display position to a second display position at which the auxiliary video data at least partly covers the active video area for reducing said covered part of the black bar area, and
the processing means being arranged for shifting the overlay area in dependence of the offset data from the first display position to the second display position.

2. Device as claimed in claim 1, wherein the device comprises a digital output unit for outputting digital video data and transferring control data according to a predetermined digital video transfer format, and the means for receiving a display aspect ratio indicator are comprised in the digital output unit for receiving the display aspect ratio indicator via the control data.

3. Device as claimed in claim 1, wherein the offset data comprise at least one of
a vertical shift value to be applied to offset a graphics object;
a vertical shift value to be applied to a subtitle;
an offset instruction embedded in an application program which is comprised in the auxiliary video data for controlling the display of the auxiliary video data.

4. Device as claimed in claim 3, wherein the offset data further comprises at least one horizontal shift value.

5. Device as claimed in claim 1, wherein the offset data is provided in an auxiliary data structure according to a predefined video format, at a reserved field in the data auxiliary structure that has a predetermined value according to the predefined video format, and the processing means are arranged for processing said predetermined value as a zero offset and processing further values of the field as offset values.

6. Device as claimed in claim 1, wherein the auxiliary video data comprise a multitude of graphical objects defined with reference to a same overlay area, and the offset data comprise a same value for the offset of each of the graphical objects of said multitude.

7. Device as claimed in claim 1, wherein the auxiliary video data comprise a multitude of presentation modes of the auxiliary data, and the offset data comprise an offset indicator that designates a subset of said multitude which applies for the display aspect ratio.

8. Device as claimed in claim 1, wherein the data input means comprise means for retrieving the main video data, the auxiliary video data and/or the offset data from a record carrier or a network.

9. Device as claimed in claim 1, wherein the data input means are arranged for retrieving the offset data separately from the auxiliary data via at least one of
- a file stored on a record carrier separately from the video data and auxiliary data;
- an offset data server coupled to a communication network.

10. Method of processing video data by a video data processing device, comprising
- receiving main video data and auxiliary video data, the main video data having a source aspect ratio, the main video data having an active video area having an aspect ratio wider than the source aspect ratio and at least one black bar area adjacent to the active video area, the auxiliary video data being arranged for display in an overlay area on the main video by indicating a first display position at which the auxiliary video data covers at least part of the black bar area,
- receiving a pre-stored display aspect ratio indicator upon being coupled to a digital display unit, the display aspect ratio being wider than the source aspect ratio,
- generating a video signal for displaying the main video and the auxiliary video at the display aspect ratio,
- receiving offset data coupled to the auxiliary video data indicative of an offset of the auxiliary video data at the display aspect ratio from the first display position to a second display position at which the auxiliary video data at least partly covers the active video area for reducing said covered part of the black bar area, and
- shifting the overlay area in dependence of the offset data from the first display position to the second display position.

11. Method of providing auxiliary control data for video data by a video data processing device,
- the video data comprising main video data and auxiliary video data,
- the main video data having a source aspect ratio,
- the main video data having an active video area having an aspect ratio wider than the source aspect ratio and at least one black bar area adjacent to the active video area, the auxiliary video data being arranged for display in an overlay area on the main video by indicating a first display position at which the auxiliary video data covers at least part of the black bar area, and the method comprising:
- selecting a display aspect ratio wider than the source aspect ratio,
- providing, as the auxiliary control data, offset data coupled to the auxiliary video data indicative of an offset of the auxiliary video data at the display aspect ratio from the first display position to a second display position at which the auxiliary video data at least partly covers the active video area for reducing said covered part of the black bar area, and
- transferring the offset data to a destination for, at the destination,
- generating a video signal for displaying the main video and the auxiliary video at the display aspect ratio, and
- shifting the overlay area in dependence of the offset data from the first display position to the second display position.

12. Method as claimed in claim 11, wherein the method comprises:
- providing the main video data and auxiliary video data, and
- transferring the main video data, the auxiliary video data with the offset data to the destination.

13. Method as claimed in claim 12, wherein said transferring comprises manufacturing a record carrier and providing the record carrier with said main video data, auxiliary video data and offset data.

* * * * *